United States Patent [19]

Gray

[11] Patent Number: 4,926,933

[45] Date of Patent: May 22, 1990

[54] METHOD AND APPARATUS RELATING TO HEAT EXCHANGERS

[76] Inventor: James Gray, 10 Grange Park Avenue, Raumati South, New Zealand

[21] Appl. No.: 120,986

[22] Filed: Nov. 16, 1987

[51] Int. Cl.$^5$ .............................................. F28F 9/02
[52] U.S. Cl. .................................... 165/173; 165/179; 165/184; 165/905
[58] Field of Search ............... 165/173, 184, 905, 179, 165/172; 138/173, 122, 38; 126/448, 442, 443, 446, 445; 220/72; 264/177.1, 177.14, 177.16

[56] References Cited

U.S. PATENT DOCUMENTS

| | | | |
|---|---|---|---|
| 1,441,034 | 1/1923 | Schulz | 165/173 |
| 3,396,785 | 8/1968 | Kirsch | 165/148 |
| 4,132,264 | 1/1979 | Furlong | 165/184 |
| 4,266,604 | 5/1981 | Sumikawa et al. | 165/905 |
| 4,321,911 | 3/1982 | Offutt | 126/448 |

FOREIGN PATENT DOCUMENTS

| | | | |
|---|---|---|---|
| 308651 | 10/1955 | Switzerland | 165/184 |
| 500459 | 8/1976 | U.S.S.R. | 165/905 |
| 820342 | 9/1959 | United Kingdom | 165/173 |

Primary Examiner—James C. Yeung
Attorney, Agent, or Firm—Mattern, Ware, Stoltz & Fressola

[57] ABSTRACT

A heat exchanger element in the form of a cylindrical tube with an integral external helical fin extending along at least the major part of the tube length; the integral finned tube being formed by an extrusion or injection moulding process from a rigid setting plastics material. The invention includes heat exchangers incorporating or formed by the heat exchanger elements.

1 Claim, 2 Drawing Sheets

METHOD AND APPARATUS RELATING TO HEAT EXCHANGERS

BACKGROUND AND SUMMARY OF THE INVENTION

This invention relates to heat exchangers, and more particularly relates to the design of and methods of forming heat exchange elements which may be usable for a variety of purposes in the construction of heat exchange units such as, for example but not confined to, water radiators and oil coolers for internal combustion engines (e.g. in vehicles), solar heat collectors, milk coolers and the like.

One object of the present invention is to provide an element for use in heat exchanger constructions and applications, capable of being manufactured simply and at relatively low cost.

According to one aspect of this invention therefor, there is provided an element for use in a heat exchange system comprising a cylindrical tube member formed by a moulding or extrusion process from a heat resistant substantially rigid setting plastics material, said member having a smooth bore and an integrally formed helical external fin extending along at least a major part of its length.

Another object of the invention is to provide a heat exchange unit which is effective in operation and capable of being manufactured relatively simply and economically. Accordingly, in a second aspect there is provided a heat exchange unit comprising a pair of elongate manifold members of a heat resistant and substantially rigid plastics material, conjoined by a plurality of duct members formed by a moulding or extrusion process from a heat resistant and substantially rigid setting plastics material and each being of cylindrical tube form with a smooth bore and with an integral helical external fin extending along at least a major part of its length, the ends of said duct members opening into the manifold members for communication therebetween.

The invention further provides the methods and means of forming the elements and complete heat exchange units, and other and more particular objects and advantages of the invention will become apparent from the ensuing description.

It is well known to provide tubular fluid ducts with helically formed fins thereon for use in heat exchange units, but conventionally the two usually adopted known methods of forming such heat exchange elements or duct members involve in one case the provision of a separate pre-formed cylindrical tube element and the subsequent fitment on such element of a separately formed helical fin member, with the fin member being maintained in place by friction; or in the second method a pre-formed and set tubular element is provided and a helix is formed on the outer surface thereon by such as the application of special rollers to the outside of the tube to deform the metal or other material, under pressure applied by the rollers. Both methods of constructing known helically finned tubing elements can be relatively expensive and slow, and involve the employment of pre-formed lengths of tubing, whereas the present invention provides that a tubular heat exchange element or duct member incorporating an integral helically formed cooling or heat exchange fin is simply and economically provided by direct extrusion or moulding of a suitable plastics material that will be substantially rigid once set and can be manufactured in a continuous or any prescribed length and for subsequent severing in required short lengths.

The previously referred to method of forming helical fins utilizing externally applied rollers under pressure can lead to uneven or occasionally broken fin formations, or fin formations of a fragile nature and/or a weakening of the tube as a whole (sometimes necessitating the provision of an inner strengthening tube) due to the deforming of the material, and in some cases resultant work hardening of the material, whereas the formation of the plastics elements or duct members of this invention by an extrusion or moulding process provides an integrally formed fin which is easily formed to any desired thickness or cross-section whilst maintaining its desired strength and without any stress being placed on, or weakening of, the main cylindrical tube part of the element or duct member.

The term "heat resistant plastics" as used herein means a plastics material such as a thermo plastic polymer material, that once set and hardened is capable of withstanding relatively high temperatures without the plastics material breaking down or deforming. One preferred application of the present invention is in the formation of water cooling radiators for internal combustion engines e.g. in motor vehicles, and the plastics material utilized must therefore be able to withstand the anticipated maximum heat variations, as well as pressure variations to which a normal internal combustion engine radiator is subjected; and some examples of suitable or possibly suitable plastics materials having the required heat resistance, workability and strength characteristics include those manufactured and sold under the registered Trade Marks ARNITE, UDEL, VITREX and ULTEM.

BRIEF DESCRIPTION OF THE DRAWINGS

Some preferred aspects of the invention will now be described by way of example and with reference to the accompanying drawings, in which.

DETAILED DESCRIPTION OF THE PREFERRED EMBODIMENTS

Figure 1:
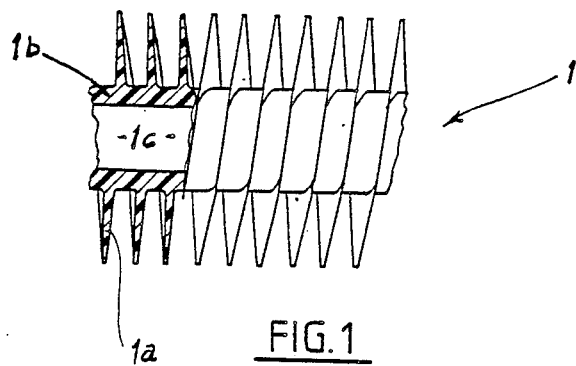
FIG. 1 is a part sectional view of a fragment of heat exchange element in accordance with this invention.
Figure 2:
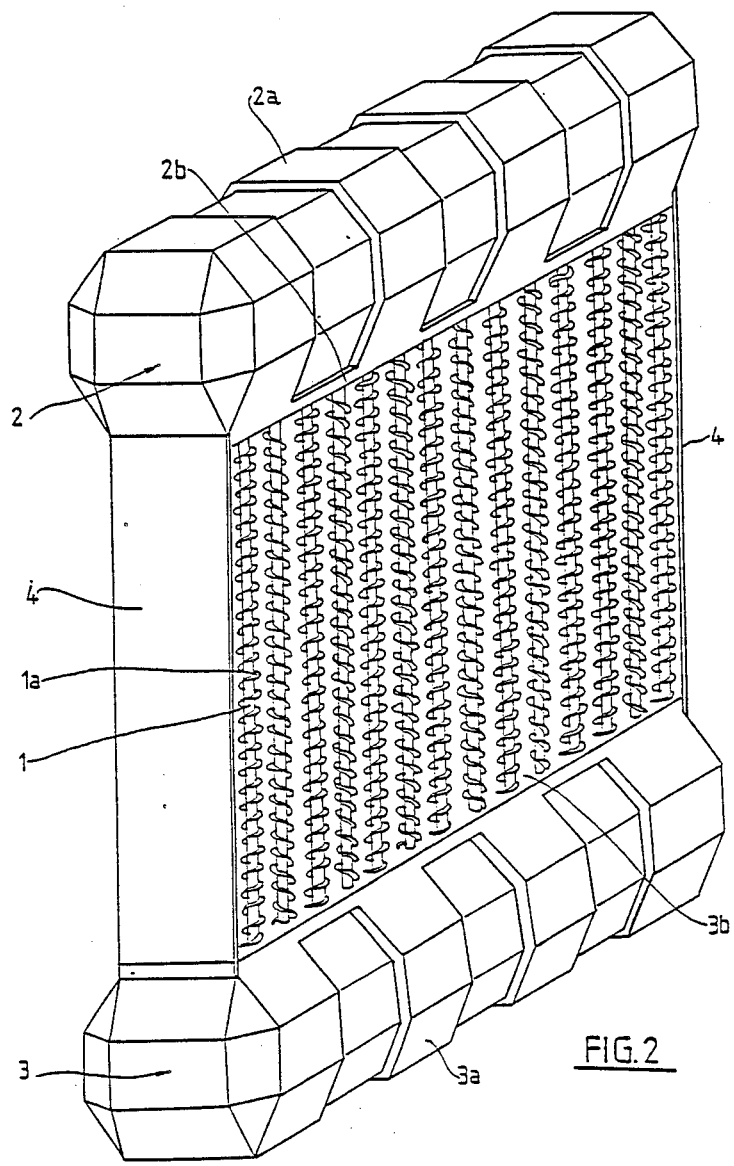
FIG. 2 is a perspective view illustrating one preferred form of heat exchange unit incorporating the invention and in the form of a water cooling radiator for an internal combustion engine.

Referring firstly to FIGS. 1 and 2 of the drawings, in one form of radiator in accordance with the invention, the complete radiator is made of the same or similar heat resistant plastics material which will be substantially rigid when set, and comprises (with the radiator disposed upright) upper and lower manifold members or reservoir sections 2 and 3 (the upper section 2 forming the usual expansion chamber) arranged to extend transversely of the radiator and which sections can be formed by fabricating in parts or integrally such as by injection moulding, and with thickened or stepped portions 2a and 3a providing reinforcing for such upper and lower sections 2 and 3. The upper and lower sections 2 and 3 are provided with inner opposed flat wall parts 2b and 3b between which a plurality of the tube elements 1 of the invention are located and secured in spaced parallel relationship, such tube elements 1 being open-ended and can either have their end portions located in preformed apertures or socket connections in the upper and lower section wall parts 2b and 3b, or can alternatively have their end portions located over complementary tubular spigot connections on such wall parts 2b and 3b, so as to provide communication between the upper and lower sections 2 and 3. The tube element end parts may be secured and sealed (without blocking communication between) to the upper and lower section wall parts 2b and 3b such as by the employment of an appropriate plastics adhesives, or such as by welding of the plastics material. Employment of adhesives will probably be the least expensive and simplest method of forming the radiator. The core of tube elements 1 thus placed can be protected by end wall panel parts 4 having their respective upper and lower end portions bonded to the upper and lower manifold members or reservoir sections 2 and 3, such end wall panel parts 4 further serving to strengthen the formed radiator. If so desired and particularly with larger radiator formations, intermediate stiffening wall panels similar to the end wall panels or parts 4 can be provided between the upper and lower reservoir sections 2 and 3.

In one preferred form of the invention and to assist in providing maximum efficiency for cooling purposes, at least some of the core tubular elements 1 are provided with oppositely wound helical fins 1a, and such elements 1 with the oppositely wound helical fins 1a are located in staggered relationship relative to the other tube elements 1 so that air flow through the radiator core is subject to a counter baffling effect so as to have a maximum cooling or heat exchange effect on the tube elements 1 and their fins 1a. In the illustrated form of the invention alternate ones of the tube elements 1 have their helical fins 1a extending in opposite directions to the adjacent tube elements 1. The radiator may have an appropriate inlet opening and closure cap (the latter being of plastics and/or metal) in the upper reservoir of expansion chamber section 2, and a drain tap or the like (again of plastics and/or metal) subsequently fitted to the lower reservoir section 3.

The construction of conventional radiators for motor vehicles is a complicated and expensive process, and generally results in a fairly weighty object having regard to the use of metal such as steel or copper in a formation of the core and upper and lower reservoir sections, and particularly with extensive use of large quantities of heavy lead solder in the sealing of the joints. The present invention provides for a relatively simply and inexpensively formed radiator which may be robust and less likely to damage than the normally relatively fragile metal core arrangements, and a radiator which is relatively light in weight and thus may assist in improving a vehicles performance on power to weight ratio.

It will be appreciated that the invention is not confined to the construction of vehicle radiators but that, for example, such as solar heat collectors for heating water (or air or other fluid) can be similarly formed; and in the case of solar heater constructions, it is preferable that the plastics material utilized be black in colour and of matt finish for maximum solar heat absorption and without the need for painting. Other applications of the heat exchange elements in accordance with the invention may be in the construction of oil coolers for motor vehicles or stationary internal combustion engines, and fluid coolers for other purposes e.g. as in the dairy industry for milk cooling (where an appropriate plastics being chosen for hygienic purposes and which will be readily sterilized without adverse effects); air conditioning and refrigerating equipment etc; with further applications being in the construction of water or oil radiators for projecting radiated heat in such as domestic and commercial applications.

The first form of radiator for water cooled engines has been described and illustrated as being upright in the conventional manner and for convenience of description; but it will be appreciated that for some applications the radiator or other heat exchange unit may for example be disposed in an inclined manner, transversely or horizontally, according to any particular application or requirement.

As previously indicated the essential basic feature of the present invention is the provision by a moulding or extrusion process of an all plastics tubular heat exchange element 1 with an integral external helical fin 1a extending along the length of the element. By a moulding or an extrusion process the formed fin 1a may retain precisely the same physical characteristics as the main cylindrical tube part 1b and can be varied according to requirements as to cross section (e.g. the fin 1a may have the tapered form indicated by way of example in FIG. 1 or may have substantially rectangular or parallel faced form), pitch and (more importantly) as to diameter and thickness relative to the main tube part 1b. It is generally accepted that most metals used in heat exchangers e.g. copper, steel and aluminium will have a higher heat conductivity rate than most plastics materials, and therefor size for size a metal heat exchange element may be more efficient than a similar plastics heat exchange element. However, as previously mentioned the costs of forming a plastics element by an extrusion process as proposed are considerably less than providing a similar metal finned element, and the proposed plastics finned element can additionally be readily made to present a relative large fin surface area to improve the heat exchange effectiveness between ambient fluid and fluid contained within or passed through the element so that any material efficiency disadvantage by the use of plastics is outweighed.

Figure 3:
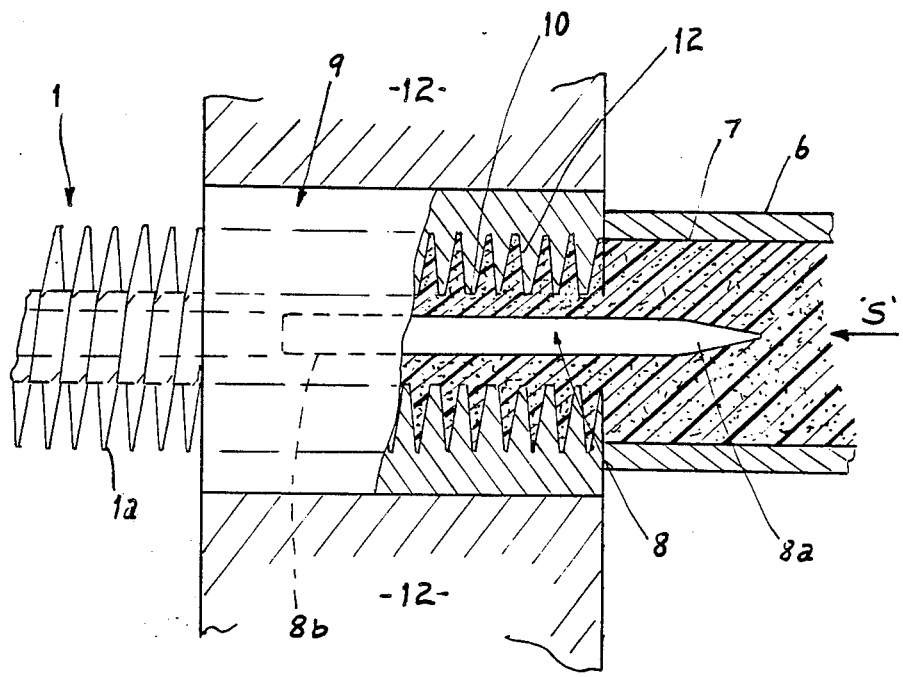
FIG. 3 is a diagrammatic part sectional view illustrating a means for forming the heat exchange elements or duct members for a heat exchanger.

Referring now to FIG. 3 of the drawings, the finned elements 1 can be formed by extruding the plastics material 5 in its initial fluid plastic or malleable state from a supply source under pressure through a stationary first outlet die part 6 having a cylindrical first outlet bore 7, over a downstream end part 8a of a substantially cylindrical elongate mandrel 8 mounted co-axially of the first outlet bore 7, and into and through a second die part 9 abutting the outlet end of the first die part 6 and having a main bore 10 axially aligned with the first outlet bore 7 and having a helical groove or channel 11 disposed concentrically about and opening to the main bore 10, said groove or channel also opening to both ends of the second die part 9. The mandrel main cylindrical body part extends co-axially into the main bore 10 for at least a major part of its length so as to form the bore 1c of the tube element 1 and prevent collapse of such bore 1c as the material 5 in its plastic or malleable state is forced into the areas of the main bore 10 and helical groove or channel 11 about the mandrel 8 and through the second die part 9 to emerge as the formed tubular helically finned element 1.

The main bore 10 defining the outer diameter of the element tube part 1b can be truly cylindrical and have the same cross section throughout its length, or such main bore 10 can be tapered with a larger diameter inlet end joining the first outlet bore, and similarly the helical groove or channel 10 can be of uniform size in cross section throughout its length or alternatively a progressively changing cross section with a larger diameter and/or thickness at the inlet end opening to the first outlet bore 7 and a diameter and cross sectional size and shape conforming to the required helical fin size and shape at the outlet end 9a of the second die part 9.

It is envisaged that the second die part 9 can also remain stationary in its mounting 12 so that the fluid malleable plastics passing under pressure from the first outlet die part 6 is forced to follow the helical path defined by the groove or channel 11 of the stationary second die part and in so doing twists axially as the plastics material partially sets and the formed element 1 twists as it leaves the second die part. Alternatively it is envisaged that the second die part 9 can be of substantially cylindrical form and held captive but arranged to be axially rotated relative to its mounting 12 the formed element 1 and element 1 being formed. The second die part 9 can be rotated mechanically by any suitable drive means (not shown) and power source. Provision can be made for a cooling fluid to be applied to the formed element as it leaves the second die part 9 to assist final setting and prevent deforming, and/or it is envisaged that an associated severing means can be provided to sever the continuously extruded element into prescribed lengths according to particular requirements.

It will be appreciated by a person skilled in the art of tool die making and plastics extrusion that the choice of a stationary or a rotatable die part 9 may be dependant on factors such as the desired helical fin shape, and the pitch and angle relative to the tube axis, the malleability of the plastics and the force applied during extrusion.

It will be appreciated that fixed relatively short lengths of the helically finned plastics element can be produced by injection moulding of plastics, and this method may be a suitable process for many applications. However, the extrusion process described is much preferred and will be generally the most economical method of manufacture; and the element can be readily formed continously in any desired long lengths.

Other variations of and modifications to the invention can take place without departing from the scope of the appended claims.

Having thus described the invention, what is claimed is:

1. A heat exchange unit having a plurality of tube members for the passage of fluid therethrough, characterized in that each tube member is formed by an extrusion process from a heat resistant substantially rigid setting plastic material so as to have a wall part with an uninterrupted smooth cylindrical bore and a solid thin helical external fin formed integrally with the tube wall part and extending along at least a major part of its length, said plurality of extruded plastic tube members are disposed in spaced substantially parallel relationship and are joined at one end to a first plastic manifold member and at their opposite ends to a second plastic manifold member in providing communication between the two manifold members for the passage of fluid therebetween, and at least some of said extruded plastic tube members have their helical fins oppositely wound relative to the other of said tube members, and said tube members with the oppositely wound fins are located in staggered relationship relative to said other tube members to provide a counter baffling effect on fluid passed externally over said tube members.

* * * * *